L. D. YORK,

Assignor to YORK MANUFACTURING COMPANY, Limited.

ROAD SCRAPER.

No. 10,390. Reissued Oct. 2, 1883.

WITNESSES—

Charles R. Searle.

H. A. Johnstone.

INVENTOR—

Levi D. York by his attorney

Thomas D. Stetson

N. PETERS, Photo-Lithographer, Washington, D. C.

UNITED STATES PATENT OFFICE.

LEVI D. YORK, OF PORTSMOUTH, OHIO, ASSIGNOR TO YORK MANUFACTURING COMPANY, (LIMITED,) OF SAME PLACE.

ROAD-SCRAPER.

SPECIFICATION forming part of Reissued Letters Patent No. 10,390, dated October 2, 1883.

Original No. 251,683, dated December 27, 1881. Application for reissue filed August 31, 1883.

*To all whom it may concern:*

Be it known that I, LEVI D. YORK, of Portsmouth, in the county of Scioto, in the State of Ohio, have invented certain new and useful Improvements Relating to Road-Scrapers, of which the following is a specification.

What is here termed a "road-scraper" is the well-known implement for conveniently taking up and transporting sand and other loose earth to short distances by animal-power, being simply drawn over the ground and caused to scrape up earth at one point and to dump it at another. It is important that the device be light, strong, and cheap. I make the entire body of the scraper from a single piece of rolled steel or hard iron of proper thickness, the blank being formed by cutting and bending. I avoid cutting any portion of the blank. The bent or folded portion at the rear of the scoop-shaped structure serves for attaching the handles.

The accompanying drawings form a part of this specification, and represent what I consider the best means of carrying out the invention.

Figure 1:
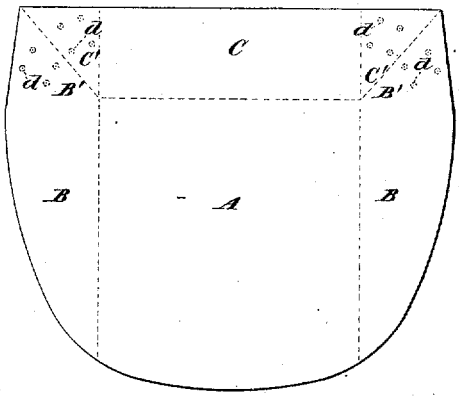
Figure 2:
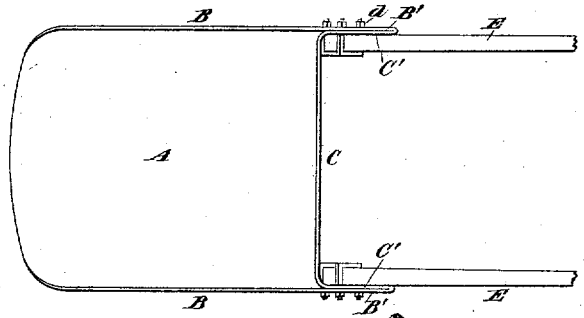
Figure 3:
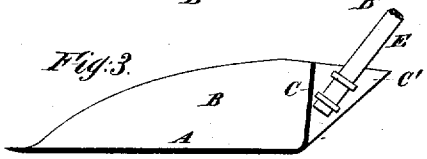
Figure 4:
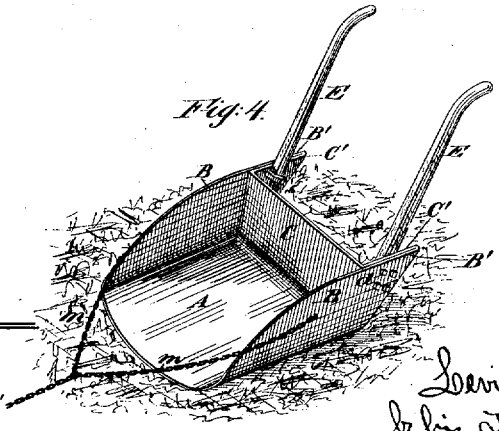

Figure 1 shows the sheet of metal cut into proper shape for forming the scraper, but before it is bent. The dotted lines indicate the places where it is bent up. Fig. 2 is a plan of the scraper; Fig. 3, a longitudinal section, showing where the handles are fastened; and Fig. 4 is a perspective view of the same on a smaller scale.

Similar letters of reference indicate like parts in all the figures where they occur.

The entire sheet, before bending, is marked A. A is the bottom and main effective portion. B B are the bent-up portions which form the sides. C is the bent-up portion which constitutes the back, and B′ C′ are folded portions extending rearward from each side of the back. Holes *d* are punched or otherwise produced in the latter, and receive bolts or rivets, which strongly and rigidly secure thereto suitable handles, E, by which the scraper is controlled by the attendant. The chain or other attachment by which it is drawn is indicated by *m*, and may be attached in the ordinary manner.

The scraper serves in the ordinary manner and performs its ordinary functions. The great strength and lightness due to its manufacture from a single piece adds materially to its usefulness for repairing roads, digging cellars, and all the purposes for which this class of implements is used.

The attachment of the handles is unusually reliable, and in no way interferes with the uses of the device.

Modifications may be made. The width and height relatively to the length may be varied. The form of the outline of the structure may be modified within wide limits. The handles may be braced across. The point of attachment of the bail *m* may be varied.

I claim as my invention—

1. A road-scraper formed from a single piece of metal by folding, as herein specified.

2. The scraper-body described, formed of metal in one piece, folded as shown, without cutting, with the folds extended rearward, adapted to serve the double functions of taking up the metal and forming attachments for handles, as herein set forth.

3. A road-scraper formed from rolled metal in a single piece, and having portions extending backward from the sides, in combination with the handles E, secured to the latter, substantially as herein specified.

In testimony whereof I have hereunto set my hand, at Portsmouth, Ohio, this 21st day of July, 1883, in the presence of two subscribing witnesses.

LEVI D. YORK.

Witnesses:
EDWD. N. HOPE,
S. C. ROBINSON.